United States Patent [19]

Cristie

[11] Patent Number: 4,924,723
[45] Date of Patent: May 15, 1990

[54] SHIFT CONSOLE FOR BICYCLES

[76] Inventor: Martin Cristie, 1445 Shore Parkway, Brooklyn, N.Y. 11214

[21] Appl. No.: 334,154

[22] Filed: Mar. 20, 1989

[51] Int. Cl.⁵ .................. B62M 25/04; G05G 7/10
[52] U.S. Cl. .................................... 74/473 R; 74/475; 74/489; 74/502.2
[58] Field of Search .............. 74/473 R, 475, 488, 74/489, 502.2; 280/288.4

[56] References Cited

U.S. PATENT DOCUMENTS

| | | | |
|---|---|---|---|
| 3,406,587 | 10/1968 | Brilando et al. | 74/502.2 X |
| 3,418,867 | 12/1968 | Maeda | 74/502.2 X |
| 3,426,614 | 2/1969 | Brilando et al. | 74/502.2 |
| 3,499,346 | 3/1970 | Ishida et al. | 74/502.2 |
| 3,524,979 | 8/1970 | Cohen | 74/488 X |
| 3,534,627 | 10/1970 | Schwerhofer | 74/473 |
| 3,701,546 | 10/1972 | Schwerdhofer et al. | 74/551.8 |
| 4,189,954 | 2/1980 | Nakamura et al. | 74/475 X |
| 4,270,481 | 6/1981 | Watarai | 74/502.2 X |
| 4,310,260 | 1/1982 | Katayama | 74/551.1 X |

*Primary Examiner*—Allan D. Herrmann
*Attorney, Agent, or Firm*—Charles E. Temko

[57] ABSTRACT

An improved shift console for bicycles which is mounted on the front fork stem extension projecting forwardly of stem axis so as not to interfere with the movements of the rider and permit a clearly visible showing of the location of the shift lever within the normal line of sight of the rider.

1 Claim, 2 Drawing Sheets

SHIFT CONSOLE FOR BICYCLES

BACKGROUND OF THE INVENTION

This invention relates generally to the field of foot powered cycles, and more particularly to an improved shift console therefor from which selection of a desired speed ratio is controlled. Devices of this general type are known in the art, and the invention lies in specific instructional details which provide improved convenience and safety to the rider.

As contrasted with relatively sophisticated ten speed bicycles which provide means for shifting the sprocket chain both at the crank and the rear wheel sprocket cluster, many cycles, particularly adapted for junior riders, are equipped with rear hubs having relatively fewer speed changes which may be accomplished either by shifting the sprocket chain to a sprocket of greater or less diameter on the cluster, or by planetary gears controlled within the hub itself. Only a single control cable is necessary to accomplish this purpose.

In the prior art, it has been common to place the lever actuating this single cable either upon the handlebar adjacent one of the grip portions, or on the uppermost of the longitudinally extending members of the frame where it projects into the path of movement of the legs of the rider during pedaling. In both cases, the observation of the position of the control lever requires the rider to divert his normal direction of sight, during which time he is not able to observe the path of travel ahead of him.

In an attempt to ameliorate this problem, it has been proposed to place the lever and accompanying console upon the upper portion of the front wheel stem, so that while it rotates with the pivoting of the stem as occurs during steering, it is, at least, out of the area disposed rearwardly of the stem where projecting surfaces are considered to be a safety hazard. However, this location does leave much to be desired, in that the position of the shift lever is not immediately viewable, and even when viewed, it is possible, because of the angle of view with respect to the rider to mistake the actual position.

SUMMARY OF THE INVENTION

Briefly stated, the invention contemplates the provision of an improved shift control of the class described, in which the above-mentioned disadvantages have been substantially eliminated. To this end, the disclosed embodiment includes a front wheel stem having a forwardly directed extension which is of greater than normal length. A housing forming a console and supporting a pivotally mounted control lever is mounted with its principal longitudinal axis parallel to the axis of the extension. The control cable extends downwardly and rearwardly therefrom and may be supported from a longitudinally extending frame member to terminate in the area of the rear wheel hub.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
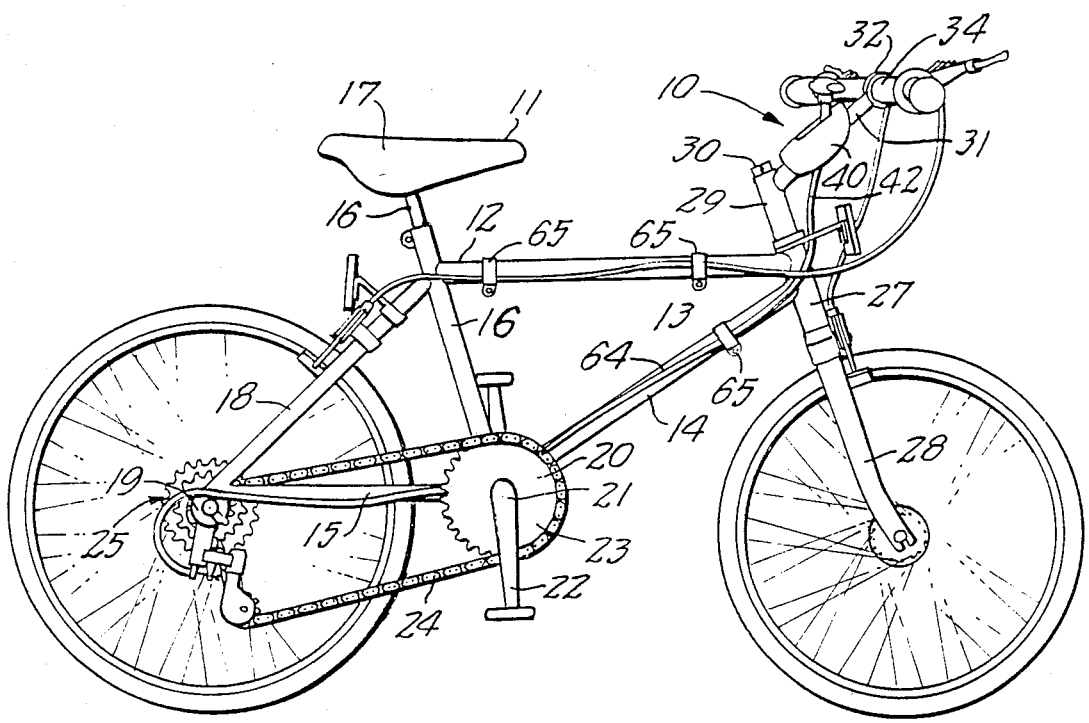
FIG. 1 is a perspective view of an embodiment of the invention.
Figure 2:
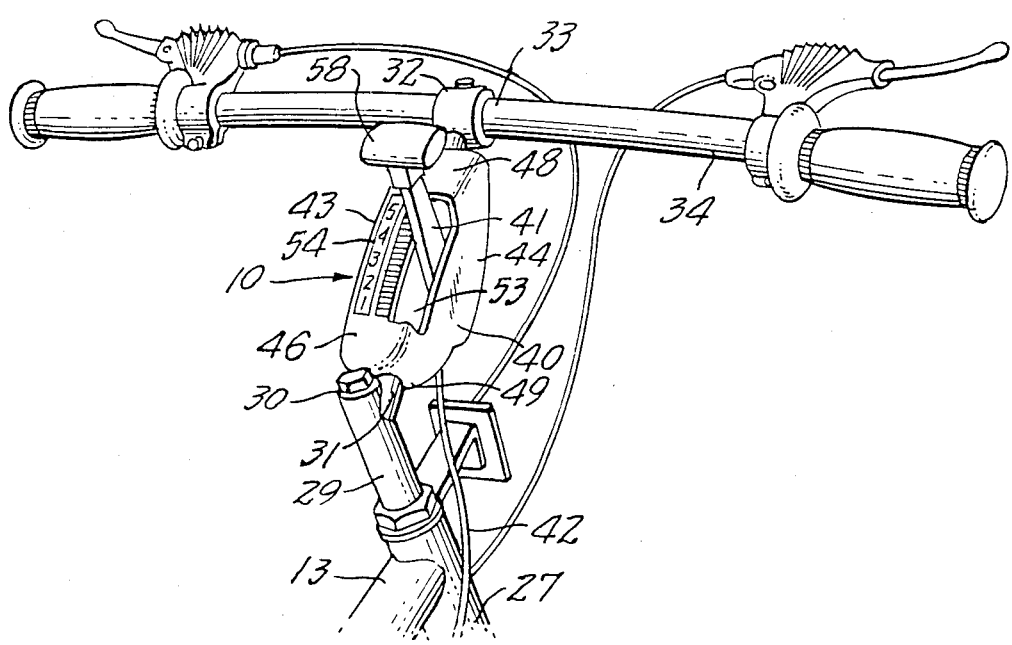
FIG. 2 is a fragmentary top plan view thereof corresponding to the upper right-hand portion of FIG. 1.
Figure 3:
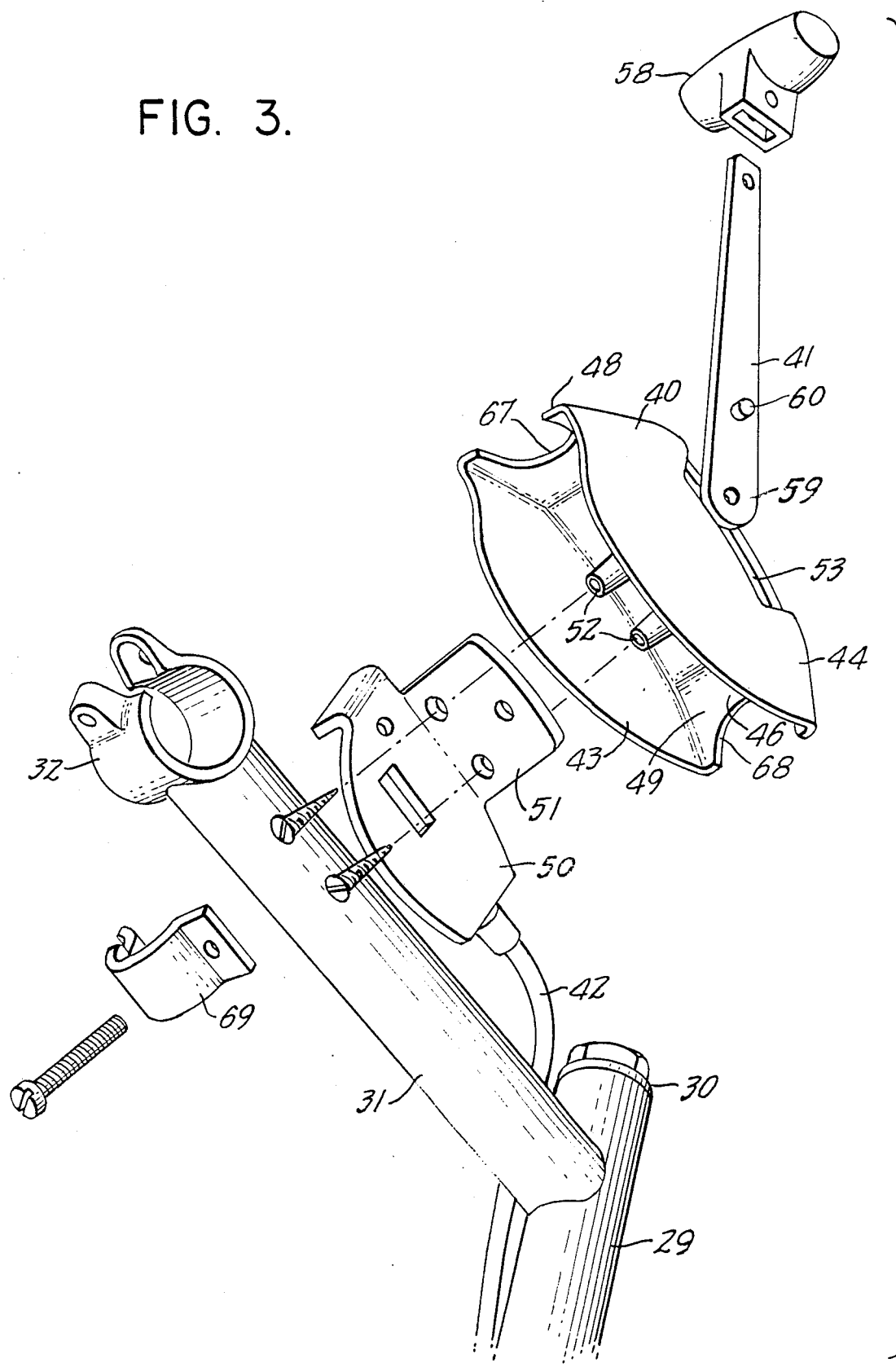
FIG. 3 is an exploded view in perspective of the embodiment.

In accordance with the invention, the device, generally indicated by reference character 10 is illustrated in the drawing in installed condition upon a conventional bicycle 11 having a longitudinally extending frame 12. The frame 12 includes upper and lower longitudinal members 13 and 14, a rear horizontal member 15, a first vertical member 16 supporting a saddle 17, a second vertical member 18, which, in turn, supports a hub element 19 in conjunction with member 15. At the junction of members 14 and 16 indicated by reference character 20, is a crank hanger 21 supporting a conventional crank 22, a single sprocket 23 and a sprocket chain 24. The rearward end of the chain is carried by a sprocket cluster 25, as is known in the art.

At the forward end of the frame is a hollow vertical member 27 carrying a front wheel fork element 28 including an upper stem portion 29 which projects therefrom. The stem terminates at point 30, from which a forwardly directed extension 31 projects to terminate in a threaded clamp 32 engaging the central portion 33 of a handlebar 34. The extension 31 is substantially longer than normal, preferably in the range of 5 to 6 inches in length.

The device 10 includes a housing element 40 which may be of molded synthetic resinous material which carries a pivotally mounted shift lever 41 which interconnects at a lower end with a control cable 42.

The housing element 40 includes an upper wall 46, left and right side walls 43 and 44, a forward wall 48 and a rearward wall 49. A lower wall 50 includes clamping means 51 which cooperates with a pair of aligned openings 52 in the wall 46. Extending through the plane of the upper wall 46 is an elongated slot 53 having plural indexed locations 54. The lever 41 is preferably formed of metallic materials for reasons of mechanical strength, and includes a knobbed manually engageable upper end 58 and a lower end 59 pivotally coupled to the control cable 42 in known manner. Medially positioned pivot means 60 extends between the walls 43 and 44 and supports the lever 41 for movement within the slot 53. The cable 42 includes medially disposed segments 64 which are positioned with respect to the frame element 12 by conventional clips 65. The rear ends 66 thereof couples with conventional derailleur means for accomplishing speed changes in known manner.

To provide an improved appearance, the walls 48 and 49 are provided with aligned openings 67 and 68 which surround the extension 31. Clamping means 69 may be of any known type and serves to maintain the housing element 40 in position.

By positioning the housing element 40 on the stem extension, it is readily viewable at all times to the rider within the normal field of vision, without the necessity of lateral head movements. Speed selection is readily accomplished for the reason that the speed change lever is at all times within view, and the position of the level is readily apparent for the reason that the indexed locations on the upper surface of the housing element are readily visible as well.

I wish it to be understood that I do not consider the invention to be limited to the precise details of structure shown and set forth in this specification, for obvious modifications will occur to those skilled in the art to which the invention pertains.

I claim:

1. In a speed selecting shift console for use with a bicycle having a multi-speed rear hub, and mountable upon a forwardly directed extension projecting from an upper end of a front wheel stem, the improvement comprising: said forwardly directed extension having a length in the range of five to six inches; said console including a housing element of molded synthetic resinous material having a slotted upper wall, a pair of opposed side walls, and a pair of end walls defining a generally rectangularly shaped enclosure therebetween, said upper wall having a pair of threaded aligned openings extending downwardly therefrom, said side walls projecting downwardly to a greater degree than said end walls; a generally vertically oriented planar lower wall having a laterally extending member, said laterally extending member having openings in congruent relation relative to said pair of threaded openings, and screw means for maintaining said congruent relation, said lower wall having an elongated slot therein, said laterally extending member having a threaded opening; a U-shaped clamp having a first end engaging said slot, a second end having a through opening therein, and threaded means penetrating said last-mentioned opening and said threaded opening to surround said extension; a shift like lever pivotally supported by said lower wall and having means engaging a control cable at a lower end thereof, an upper end of said shift lever penetrating said slotted upper wall; said console, when mounted upon said extension, being so positioned that said housing at least partially encloses said extension, said lower wall being positioned on one side thereof, with said cable projecting rearwardly along said extension toward said stem.

* * * * *